(12) United States Patent
Alone et al.

(10) Patent No.: US 7,567,819 B2
(45) Date of Patent: Jul. 28, 2009

(54) WIRELESS NETWORK CONNECTION SYSTEM AND METHOD

(75) Inventors: Vijay B. Alone, Pune (IN); Junichi Asoh, Machida (JP); Kazuo Fujii, Yokohama (JP); Harish T. G., Sagamihara (JP); Sudham S Rao, Sagamihara (JP); Susumu Shimotono, Hadano (JP); Bijal R. Thanawala, Sagamihara (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 366 days.

(21) Appl. No.: 10/645,402

(22) Filed: Aug. 21, 2003

(65) Prior Publication Data

US 2004/0110530 A1 Jun. 10, 2004

(30) Foreign Application Priority Data

Aug. 21, 2002 (JP) ............................. 2002-241136
Feb. 25, 2003 (JP) ............................. 2003-047617

(51) Int. Cl.
*H04W 84/02* (2009.01)
(52) U.S. Cl. ................ 455/552.1; 455/426.1; 455/41.2; 455/433; 455/432.1; 370/329
(58) Field of Classification Search .............. 455/414.1, 455/435.1, 552.1, 44.1, 41.2, 426.1, 433, 455/432.1; 320/222, 329; 209/222; 370/329
See application file for complete search history.

(56) References Cited

U.S. PATENT DOCUMENTS 5,586,338 A * 12/1996 Lynch et al. ................. 455/433

| 6,967,944 | B2 * | 11/2005 | Choi | 370/348 |
| 2002/0025810 | A1 * | 2/2002 | Takayama et al. | 455/432 |
| 2002/0085516 | A1 * | 7/2002 | Bridgelall | 370/329 |
| 2003/0158922 | A1 * | 8/2003 | Park | 709/222 |
| 2003/0200455 | A1 * | 10/2003 | Wu | 713/200 |
| 2004/0147249 | A1 * | 7/2004 | Wentink | 455/414.1 |

FOREIGN PATENT DOCUMENTS

| JP | 03-171838 | 7/1991 |
| JP | 8-501430 | 2/1996 |
| JP | 10-107718 | 4/1998 |
| JP | 10-065599 | 6/1998 |
| JP | 10-178429 | 6/1998 |

* cited by examiner

*Primary Examiner*—David Q Nguyen
(74) *Attorney, Agent, or Firm*—Patrick J. Daugherty; Driggs, Hogg, Daugherty & Del Zoppo Co., LPA

(57) ABSTRACT

A System and Method provides for a connection to a predetermined access point in an optimal time even when a network name of the access point is hidden. A computer apparatus comprises a connection list table for storing the identification information of a wireless network and the information indicating that the access point for connection to the network is a "hidden access point" having not issued the identification information in association with the identification information, and an access point switching software for confirming the connection by trying an actual connection to the "hidden access point" after getting the information from the connection list table, and for acquiring the predetermined identification information by scanning the identification information for designating a connection partner.

8 Claims, 15 Drawing Sheets

| Priority | Network name (SSID) | Flag |
|---|---|---|
| 1 | AAAA | U (Unknown) |
| 2 | BBBB | P (Public) |
| 3 | CCCC | H (Hidden) |
| 4 | DDDD | P |
| 5 | EEEE | H |
| 6 | FFFF | P |
| 7 | GGGG | P |
| ⋮ | ⋮ | ⋮ |
| M | XXXX | H |

FIG. 3

Try the connection with the location profile in the higher order of priority.

Location profile checked in the list is employed by automatic switching.

| | Priority | Location profile name | Network name (SSID) |
|---|---|---|---|
| ☑ | 1 | Wireless at Home | D526B5GROUP |
| ☑ | 2 | Yamato Wireless Office | IBM |
| ☑ | 3 | ROARD | AP-0031 |
| ☑ | 4 | Cafe | NLSCAFE |
| ☑ | 5 | Airport | NARITA |
| ☑ | 6 | Hotel | HOTEL_WLAN |

FIG. 6

WIRELESS NETWORK CONNECTION SYSTEM AND METHOD

BACKGROUND OF THE INVENTION

The present invention relates to a computer apparatus that communicates on a network, and more particularly to a computer apparatus connectable with a wireless LAN.

A computer apparatus represented by a notebook type personal computer (note PC) is connected to a network such as a LAN (Local Area Network) through an interface unit called an NIC (Network Interface Card) or a LAN adapter. The interface unit connected to the network was a modem at the beginning, but at present, the wire telecommunications such as a token ring (Token-Ring) or the Ethernet (trademark of Xerox, United States) are the mainstream. In the future, the spread of wireless LANs is predicted in order to avoid complex cable wiring, along with the rapid developments of the note PC, portable telephone and mobile terminal such as a PDA.

Herein, for a portable type computer apparatus that is employed while traveling such as the note PC or mobile terminal, it is required for the apparatus to connect to a network at each transfer site. Since the network environment is generally varied for each transfer site, first of all, the portable type computer apparatus has preferably a plurality of network adapters to enable the connection at each transfer site. Also, it is effective to select a network adapter usable at the site from among the plurality of network adapters provided, and make the suitable network settings for the network adapter at the site.

Though this invention is not directly concerned, one of the prior arts associated with the wireless LAN system is an access point device with the enhanced security level, and its approval method, see Published Unexamined Patent Application No. 2001-345819 (pages 4 and 5, FIG. 1).

However, when using a conventional operating system (OS), where a system has a plurality of network adapters, there was no explicit meansra for designating which network adapter to use to make the connection to the network. That is, in the conventional operating system, a desktop type PC in which no movement of location is supposed or anticipated is kept in mind, and there is almost no need or requirement for designating which network to select to make the connection. Therefore, it was required to switch the network by physical means of removing the network adapter or network cable to designate the connection using the conventional system.

Also, in the conventional operating system, one network adapter allowed only one network connection to be set up. Particularly in the mobile specifications for mounting on the note PC or the like, when one network adapter was shared between office and house, which have different settings, it was required to take the effort and trouble to change the network settings every time a network connection was initiated. Also, it is especially difficult to set up the network for the beginner user, and since there appears successively new networks such as a wireless network, a VPN (Virtual Private Network) and a broad band connection or network, it is more complex and difficult for the user to configure and make the network connection.

In the light of this problem, a technique or method has been offered in Japanese Patent Application No.2002-27459 in which the network name of access point is detected through the use of an application and the settings and configuration of a network such as a wireless LAN are automatically performed. This offered technique is superior in that the user can make the network settings automatically at anytime, and easily make the connection to the network. However, from the point of view from the security, a new demand arose for allowing the connection to the access point even when the network name of access point is hidden or unknown.

On the other hand, in the adapter of wireless LAN, it is required to scan all the channels to be supported periodically to find the access point for connection. At this time, when employing a dual mode wireless LAN adapter for handling a 802.11b base wireless network and a 802.11a fast wireless LAN, the number of supported channels (a total of 46 channels) is greater than the conventional 11b single mode adapter. Though an active scan (active search: scan method for sending a probe frame from the mobile terminal and searching for an access point upon its response) was performed in the 802.11b single mode adapter, a passive scan (passive search: scan method for monitoring a beacon signal sent from the access point for a fixed period of time) was made to support the world wide roaming in the dual mode wireless LAN adapter.

Owing to this reason, it takes about 100 seconds to make one channel scan by the dual mode wireless LAN adapter. This scan time is significantly longer than the existent 802.11 b in which the scan time is only about 2 seconds. While this channel scan is being made, the wireless client cannot enter a power saving mode such as a suspend state, increasing an average power consumption by the apparatus and thus, shortening useful operation while under battery power.

FIG. 13 is a chart showing variations in power consumption in the dual mode wireless LAN adapter. In FIG. 13, the axis of abscissas is the time (sec), and the axis of ordinates is the power consumption (W). Herein, a scan of 100 seconds and a power down of 60 seconds are repeated, in which 1 W for the scan of 100 seconds and 0.07 W for the power down of 60 seconds are consumed. Consequently, the average power consumed by a wireless LAN device may reach 650 mA in the example as shown in FIG. 13. In this case, the battery time of the note PC is shortened by 30 minutes or more.

This invention has been achieved to solve the above-mentioned technical problems, and it is a purpose of the invention to allow a connection to an access point in an optimal time even when a network name of the access point is hidden.

Also, it is another purpose of the invention to further reduce power consumption in a computer apparatus with a connection function to the wireless LAN.

SUMMARY OF THE INVENTION

In order to achieve the above purposes, the present invention provides a computer apparatus capable of making radio or wireless communications via a predetermined access point, comprising storage means or a non-volatile storage device for storing the identification information of a connectable network and the information indicating that the access point for connection to the network is a "hidden access point" having not issued the identification information in association with the identification information, connection confirmation means for confirming the connection by trying an actual connection to the "hidden access point" after getting the information from the storage means, identification information acquiring means or unit for acquiring the predetermined identification information by scanning the identification information for designating a connection partner, connection executing means or unit for executing the connection to either one of the access point of the network having the predetermined identification information acquired by the identification information acquiring means and the access point to which the connection is confirmed by the connection confirmation means, and radio function stop means or radio control unit for stopping a radio transmitting and receiving function when the identification information stored in the storage means is not acquired by the identification information acquiring means and the connection confirmation for the identification information stored in the storage means is not made by the connection confirmation means.

Herein, the storage means may store the identification information of the network appended with the order of priority for connection, and store the information indicating the "access point having issued a network name" in association with the identification information of the network. The "computer apparatus" may be a personal computer such as the note PC, or a variety of kinds of mobile terminal equipment such as a PDA or portable telephone. The same applies in the following.

Also, this invention provides a computer apparatus comprising storage means for storing the information of a network to make a wireless LAN connection, determination means or unit for determining whether or not the connection to the network having its information stored in the storage means is possible, and radio transmitting and receiving function stop means for turning off a radio transmitting and receiving function to make the wireless LAN connection while the power of a system is turned on, when the determination means determines that the connection to all the networks having its information stored in the storage means is not possible. Herein, the determination means determines whether or not the connection to the network having its information stored in the storage means is possible by scanning the identification information, and/or determines whether or not the connection to the network having its information stored in the storage means is possible by trying an actual connection.

From another aspect of the invention, there is provided a computer apparatus, comprising connection candidate list storing means or unit for storing a connection candidate list including the information of a connectable network, connection means for trying the connection to the network included in the connection candidate list, and set-up means for setting the information indicating the "hidden access point" in the connection candidate list, when a network name for identifying the network is not confirmed for the network to which the connection is tried by the connection means. Herein, the set-up means sets the information indicating the "access point with a confirmed name" in the connection candidate list, when the network name for identifying the network is confirmed for the network to which the connection is tried by the connection means.

From still another aspect of the invention, there is provided a computer apparatus capable of making the radio communications via a predetermined access point, wherein access point detecting means detects whether or not there is any connectable access point, radio function stop means turns off a radio transmitting and receiving function to make the radio connection while the power of a system is kept on when no connectable access point is found by the access point detecting means, movement state sensing means or unit senses a movement state of the apparatus, and radio control means or unit turns on the radio transmitting and receiving function to make the radio communications on the basis of the movement state of the apparatus sensed by the movement state sensing means or unit. More specifically, this radio control means turns on the radio transmitting and receiving function from a state where the radio transmitting and receiving function is turned off by the radio function stop means. Herein, the movement state sensing means senses a movement state using an attitude fluctuation sensor for sensing that the apparatus is moved, and is preferable because when the apparatus is moved while the system is operating, the access point at the movement destination is roamed.

On the other hand, this invention provides a computer apparatus capable of making the radio communications via a predetermined access point, comprising attitude fluctuation sensing means for sensing an attitude fluctuation of the apparatus, and scan executing means or unit for scanning the access point on the basis of the attitude fluctuation of the apparatus sensed by the attitude fluctuation sensing means.

Herein, this computer apparatus further comprises profile storing means or unit for storing a profile of the access point, wherein the scan executing means stops the scan when the attitude fluctuation sensing means senses that the attitude of the apparatus is not fluctuating, or executes the scan for the profiles stored in the profile storing means when the attitude fluctuation sensing means senses that the attitude of the apparatus is fluctuating. This constitution is preferable because it is possible to avoid or suppress a lower throughput rate due to being able to identify and avoid unnecessary scans.

Also, this invention provides a radio network connecting method in a computer apparatus that makes the radio communications by connecting to a predetermined radio network, the method comprising a step of acquiring a network name by scanning for an access point in an environment where the computer apparatus is placed, a step of acquiring the information of a "hidden access point" having issued no network name from a connection candidate list of the radio network stored in a memory, a step of comparing the radio network with the network name acquired by the scan and the radio network of the "hidden access point" acquired from the connection candidate list in the order of priority, a step of executing the connection to the access point with the network name acquired by the scan, when the radio network with the network name acquired by the scan has a higher priority by the comparison in the order of priority, and a step of trying the connection to the "hidden access point", when the radio network of the "hidden access point" acquired from the connection candidate list has a higher priority by the comparison in the order of priority.

Moreover, this invention provides a radio network connecting method comprising a step of acquiring the information indicating that an access point for connection to the radio network is a "hidden access point" having not issued the identification information from a connection list table storing the identification information of radio network connectable by the computer apparatus, a step of confirming the connection to the radio network by trying an actual connection to the "hidden access point", a step of retrieving a predetermined access point by scanning the identification information, a step of executing the communications via either one of the retrieved access point and the "hidden access point" to which the connection is confirmed on the basis of the information stored in the connection list table, and a step of stopping a radio transmitting and receiving function when the connection to the radio network having the information stored in the connection list table is not possible.

Still further, this invention provides a radio network connecting method comprising a step of confirming whether or not there is any access point of a radio network connectable by a computer apparatus, a step of stopping a radio transmitting and receiving function when there is no access point of the connectable radio network, a step of sensing an attitude fluctuation of the computer apparatus, and a step of resuming the radio transmitting and receiving function that is stopped on the basis of the sensed attitude fluctuation. Herein, the step of sensing the attitude fluctuation comprises sensing that there is any attitude fluctuation by comparing a value of the sensor data obtained from an attitude fluctuation sensor and a normal value obtained in a still state.

Also, this invention provides a radio network connecting method comprising a step of sensing an attitude fluctuation in a computer apparatus, and a step of executing the scan for the access point according to a profile on the basis of the attitude fluctuation of the computer apparatus. Herein, the step of sensing the attitude fluctuation comprises causing an attitude fluctuation sensor to sense whether or not the computer apparatus has an attitude fluctuation after the elapse of a predetermined time, and the step of executing the scan comprises executing the scan when it is determined that the computer apparatus has an attitude fluctuation after the elapse of the predetermined time.

These inventions may be grasped as a program for causing a computer apparatus to implement the functions, in which the computer apparatus makes the communications by connecting to a predetermined network. This program is provided to the user in the form of being installed in the computer, e.g., the note PC, or stored in a computer readable storage medium. This storage medium may be a floppy disk or a CD-ROM medium, in which the program is read by a floppy disk drive or CD-ROM reader, stored in a flash ROM and executed. Also, the program may be distributed via the network by a program transmission apparatus. This program transmission apparatus may be provided at a server on the host side, and comprise a memory for storing the program, and program transmitting means for transmitting the program via the network.

This program causes the computer apparatus to implement a function of acquiring a network name by scanning for an access point in an environment where the computer apparatus is placed, a function of acquiring the information of a "hidden access point" having issued no network name from a connection candidate list of the radio network stored in a memory, a function of comparing the radio network with the network name acquired by the scan and the radio network of the "hidden access point" acquired from the connection candidate list in the order of priority, a function of executing the connection to the access point in the radio network with the network name acquired by the scan, when the radio network with the network name acquired by the scan has a higher priority by the comparison in the order of priority, and a function of trying the connection to the "hidden access point", when the radio network of the "hidden access point" acquired from the connection candidate list has a higher priority by the comparison in the order of priority.

Also, this invention provides a program for causing a computer apparatus such as the note PC to implement a function of acquiring the information indicating that an access point for connection to the radio network is a "hidden access point" having not issued the identification information from a connection list table storing the identification information of radio network connectable by the computer apparatus, a function of confirming the connection to the radio network by trying an actual connection to the "hidden access point", a function of retrieving the predetermined access point by scanning the identification information, a function of executing the communications via either one of the retrieved access point and the "hidden access point" to which the connection is confirmed on the basis of the information stored in the connection list table, and a function of stopping a radio transmitting and receiving function when the connection to the radio network having the information stored in the connection list table is not possible.

Moreover, this invention provides a program for causing a computer apparatus to implement a function of acquiring the information of the radio network from a connection list table storing the information of the radio network connectable by the computer apparatus, a function of determining whether or not the connection to the radio network having its information stored in the connection list table is possible, and a function of turning off a radio transmitting and receiving function while the power of a system for the computer apparatus is turned on, when it is determined that the connection to all the radio networks having the information stored in the connection list table is not possible.

Still further, this invention provides a program for causing a computer apparatus to implement a function of confirming whether or not there is any access point of the radio network connectable by the computer apparatus, a function of stopping a radio transmitting and receiving function when there is no access point of the connectable radio network, a function of sensing an attitude fluctuation of the computer apparatus, and a function of resuming the radio transmitting and receiving function that is stopped on the basis of the sensed attitude fluctuation.

Also, this invention provides a program for causing a computer apparatus making the radio communications via an access point to implement a function of executing the scan for a scheduled profile, a function of sensing an attitude fluctuation in the computer apparatus, a function of executing the scan for the profile when the attitude fluctuation in the computer apparatus is sensed, and a function of roaming the access point when the access point listed in the profile with a higher priority than at present is found as a result of scan.

Still further yet, this invention provides a program product comprising a computer usable medium having computer readable program code embodied therein for use with a computer. The computer readable program code in said program product implementing functions effective to: make wireless communications for connecting to a predetermined wireless network; acquire an information indicating that an access point for connection to the wireless network is a hidden access point where an identification information from a connection list table storing the identification information of a wireless network is not present; and confirm the connection to the wireless network by attempting an actual connection to the hidden access point.

This purpose is accomplished by a combination of features as defined in independent claims in the scope of claims. Also, the dependent terms define preferable examples of the invention.

The above summary of the invention does note numerate all of the necessary features for the present invention, but some combinations of these features may also be inventive features.

BRIEF DESCRIPTION of the DRAWINGS

Some of the purposes of the invention having been stated, others will appear as the description proceeds, when taken in connection with the accompanying drawings, in which:

FIG. 3 is an example of a connection candidate list stored in a connection list table;

FIG. 6 is a diagram exemplifying a switching list table displayed to the user;

DETAILED DESCRIPTION OF THE ILLUSTRATIVE EMBODIMENTS

While the present invention will be described more fully hereinafter with reference to the accompanying drawings, in which the preferred embodiments of the present invention are shown, it is to be understood at the outset of the description which follows that persons of skill in the appropriate arts may modify the invention here described while still achieving the favorable results of this invention. These embodiments are not intended to limit the invention, the scope of which is determined by the claims, and all combinations of the features described in the embodiments are not necessarily fundamental for the solution of the invention.

Accordingly, the description which follows is to be understood as being a broad, teaching disclosure directed to persons of skill in the appropriate arts, and not as limiting upon the present invention.

Embodiment 1

Figure 1:
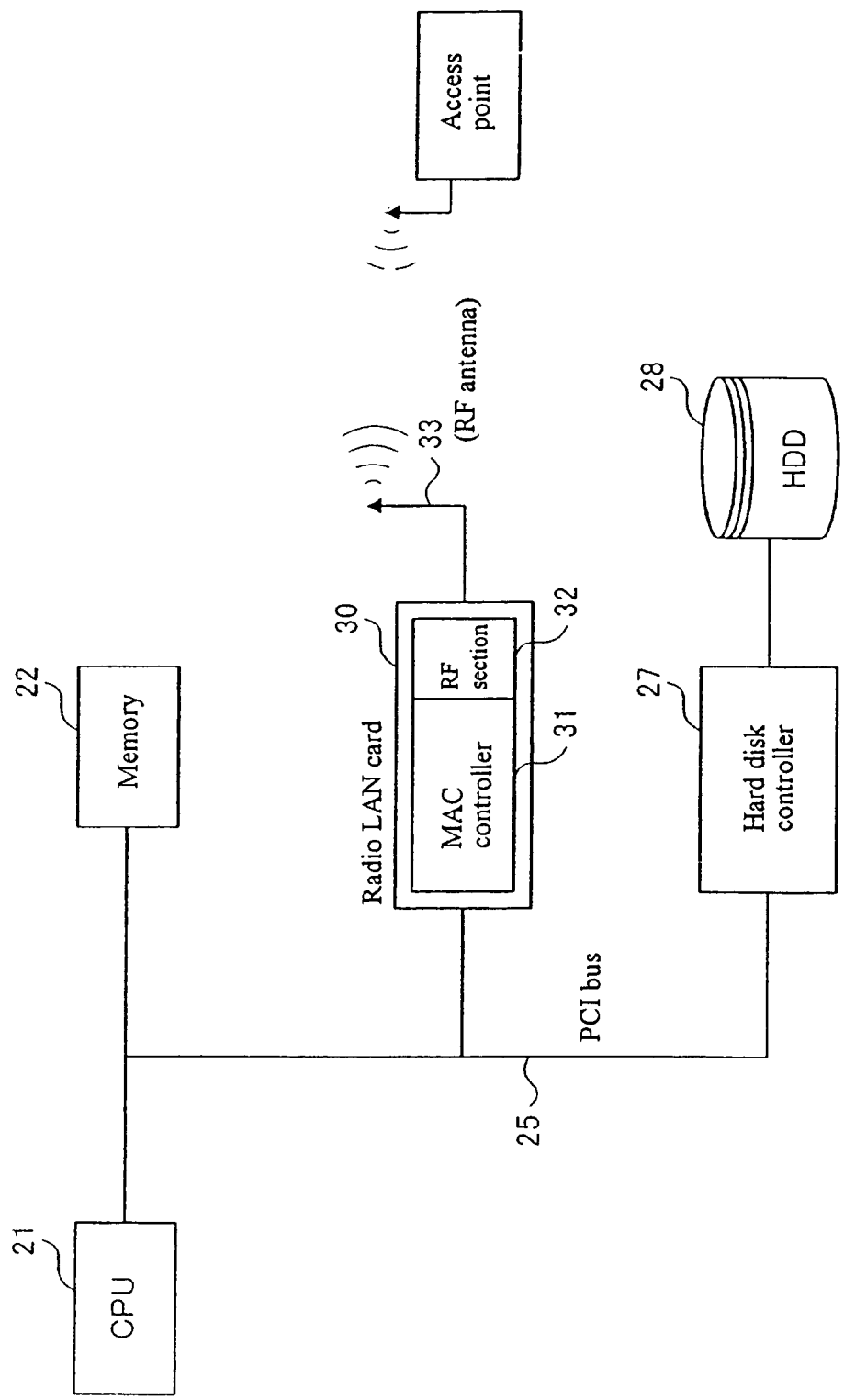
FIG. 1 is a diagram showing the hardware configuration of a network connection system according to an embodiment of the present invention.

Referring to FIG. 1, there is a diagram showing the hardware configuration of a network connection system according to an embodiment 1 of the present invention. Herein, this system configuration is provided on a note PC in one form of the computer apparatus (mobile terminal unit) and comprises a CPU 21 that operates as a brain of the entire computer apparatus to execute utility programs and various kinds of programs under the control of OS, and a memory 22 that is a main memory in which various kinds of programs (instructions) including an application program are supplied to the CPU 21 and data is stored. Also, the CPU 21 is interconnected via a PCI (Peripheral Component Interconnect) bus 25 to each peripheral device.

The PCI bus 25 is capable of making a relatively fast data transfer, and is standardized by the specifications where the data bus width is 32 bits or 64 bits, the maximum operation frequency is 33 MHz or 66 MHz, and the maximum data transfer rate is 132 MB/sec or 528 MB/sec. A hard disk controller 27, one of the peripheral devices, controls a hard disk drive (HDD) 28 as memory (storage) means and is also connected to this PCI bus 25. Also, a mini PCI slot and a PC card slot, not shown, are connected to the PCI bus 25, in which a radio LAN card 30 conforming to the mini PCI standards can be mounted (connected) into these slots. Also, the radio LAN card 30 is provided integrally with an RF antenna 33 for making radio (wireless) communications with an access point under the environment where the note PC is placed. The RF antenna 33, besides being provided integrally with the radio LAN card 30, may be a diversity antenna provided inside a housing of the note PC, in which an RF (Radio Frequency) signal is passed through the coaxial cable via an antenna connector, not shown, to make the radio communications with the access point. The access point is a connection point prepared for the user by the network service provider.

The radio LAN card 30 has a MAC controller 31 having an interface with the CPU 21 in a MAC (Media Access Control) layer that is a lower sublayer of the data link layer protocol, and an RF section (radio frequency circuit portion for radio communications) 32 for supporting the radio LAN in the 2.4 GHz band in the international standards IEEE802.11 b or in the 5 GHz band in the international standards IEEE802.11 a, and makes the communications with the access point via the RF antenna 33 under the control of the CPU 21.

In this embodiment, the connection to the access point is made in an optimal time, employing the radio LAN card 30 having the above system configuration. Also, radio function stop means is provided for turning off a radio transmitting and receiving function for the radio network while the power of a system main unit is turned on, when no connectable access point of concern is found, thereby suppressing a wasteful consumption of a battery in the system of the note PC or the like, as will be described later. Herein, as a method for turning (shutting) off the radio function in the radio LAN card 30, a technique is employed for sending a radio off command on a firmware built in the radio LAN card 30 through the CPU 21 to the radio LAN card 30 and consequently shutting off the RF section 32 of the radio LAN card 30 to turn off the radio transmitting and receiving function.

Figure 2:
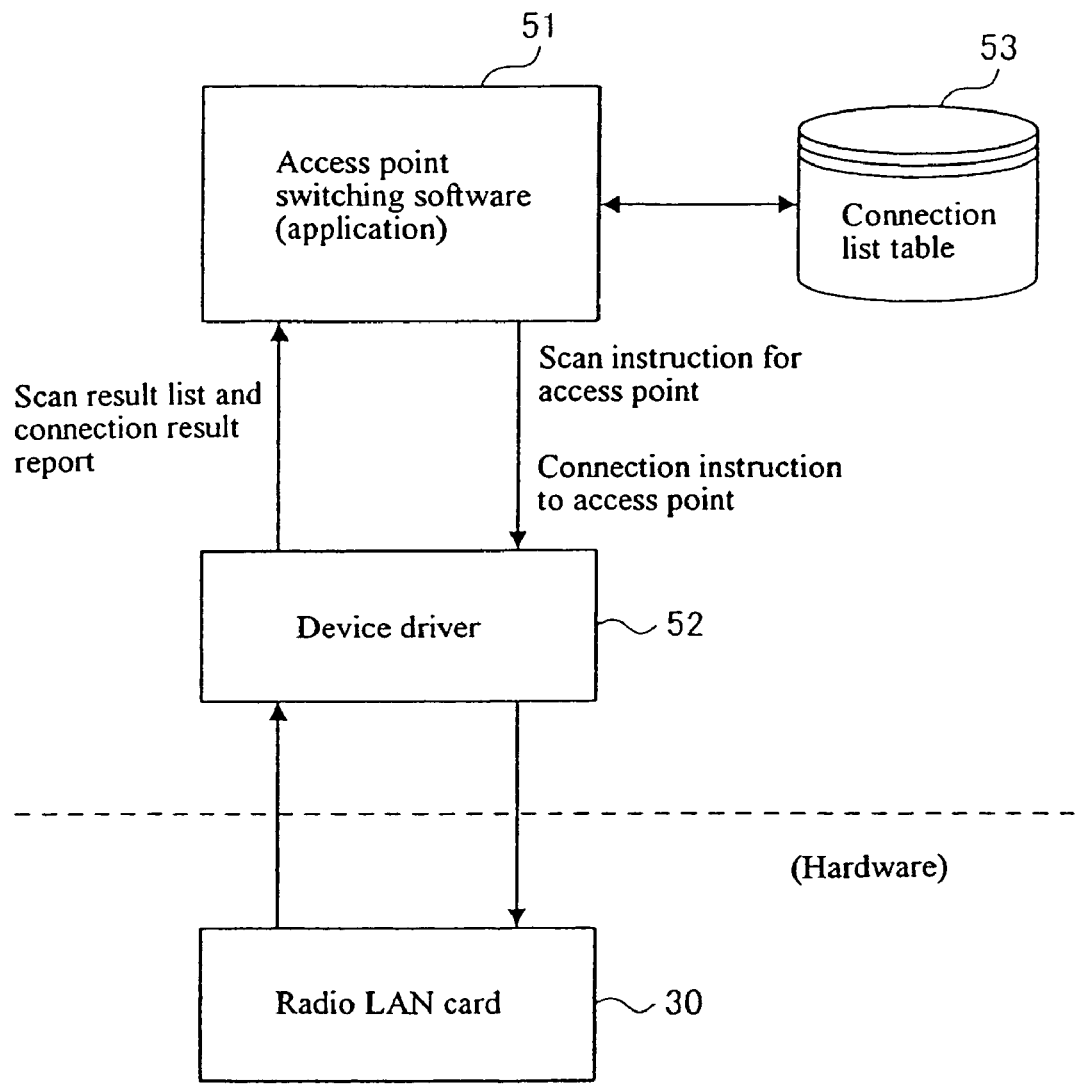
FIG. 2 is a diagram showing the software configuration in the network connection system as shown in FIG. 1.

FIG. 2 is a diagram showing the software configuration of the network connection system as shown in FIG. 1. Herein, the network connection system comprises the main components of this embodiment, including an access point switching software 51 that is an application software to be executed on the CPU 21 to perform the switching of the access point, a device driver 52 that is a software for managing the radio LAN card 30 as a device, and a connection list table 53 stored or memorized in the hard disk drive 28 and storing the order of priority and the connection list information of access points.

The connection list table 53 (storing means) stores a connection candidate list for the access point according to the order of priority, as well as various kinds of information associated with the network name. The access point switching software 51 operates as identification information acquiring means to output a scan instruction for the access point to the device driver 52 and acquire the scan result list. Thereby, by referring to the connection list table 53, it is possible to confirm whether or not there is any access point having the network name (SSID: Service Set Identification) of the access point of connection candidate around or in close proximity of the network system (e.g., note PC).

That is, in automatically switching the network, the access point switching software 51 as an application detects the SSID or the identification information of an access point, whereby the settings of the network such as a wireless LAN are automatically made, and the connection is performed by connection executing means. In the normal operation, first of all, the network name (SSID) of access point is acquired by scanning, and then it is determined whether or not a setting profile of the network containing the SSID in a location name stored in the hard disk drive 28 is registered. And if the location name is found, all the network settings including the wireless settings are automatically switched. This SSID is an identification number for designating the communication partner, and employed as a personal identification number for collation or establishing a connection with each other. The communication is not allowed between the parties unless this SSID is matched, in which the SSID is effective in an infrastructure mode and an 802.11AD Hoc mode. The identification information to be acquired by scanning, other than the SSID, may be a MAC address for identification in which the fields of a transmission source address and a destination address with fixed bit counts are provided in a MAC (Media Access Control) frame.

In this embodiment, in addition to the normal operation, if there is a "hidden access point" of the type issuing no network name (SSID) in the connection candidate list of the connection list table 53, even when the specific access point is retrieved as a result of scanning, a connection instruction for connecting to the access point of candidate with higher order of priority in the connection candidate list is output to the device driver 52, and the connection is actually tried, employing the radio LAN card 30. The device driver 52 acquires the connection result (success or failure of connection) through the radio LAN card 30, and reports the connection result to the access point switching software 51. In this way, the access point switching software 51 combines the connection and retrieval by referring to the connection list table 53, and tries the connection to the access point successively. As the actual connection, the security is designated, the channel number for the channel at the access point is set up, and the network settings are made. The connection setting information to deal with such network is associated with the network name and stored in the hard disk drive 28.

FIG. 3 shows an example of the connection candidate list stored in the connection list table 53 as connection candidate list storing means. Herein, the order of priority (priority) 1 to M is set to the network name (AAAA to XXXX) of the SSID. Also, a flag (Hidden Flag) indicating whether or not the access point is hidden is provided corresponding to the network name in the connection candidate list as shown in FIG. 3. In the example of FIG. 3, there are prepared an "H (Hidden)" flag indicating the hidden access point, a "P (Public)" flag indicating the access point having issued the network name, and a "U (Unknown)" flag indicating the unclear (unknown) hidden access point when the previously connected access point is activated employing a new software. In the example of the connection candidate list as shown in FIG. 3, the network names CCCC and EEEE are the hidden access point, AAAA is the unknown access point, and others are the access point having issued the name.

For example, consider an instance where the note PC having the connection candidate list as shown in FIG. 3 tries the radio connection under the environment where the note PC is connectable to the radio access point. When the access point switching software 51 detects the network name having the flag P as shown in FIG. 3 by scanning, the connection is executed to the access point with the highest order of priority from among the detected network names. Also, for example, in the case where the access point switching software 51 searches for the SSID, but does not detect the network name for the access point with flag P such as BBBB, DDDD, FFFF, GGGG, etc., it tries the connection to the access point with flag H that is the hidden access point in the higher order of priority. As a result, if the connection is successful in the network name XXXX with the M-th order of priority, the connection is directly maintained to continue the radio communications. As another example, suppose that as a result of searching for the SSID, the network name GGGG with the seventh order of priority is retrieved. At this time, the access point switching software 51 tries the connection to the access point with higher order of priority than the network name GGGG, and without flag P. As a result, if the connection to the access point corresponding to the network name CCCC is possible, the connection to the network name CCCC with higher order of priority is maintained to continue the radio communications.

Figure 4:
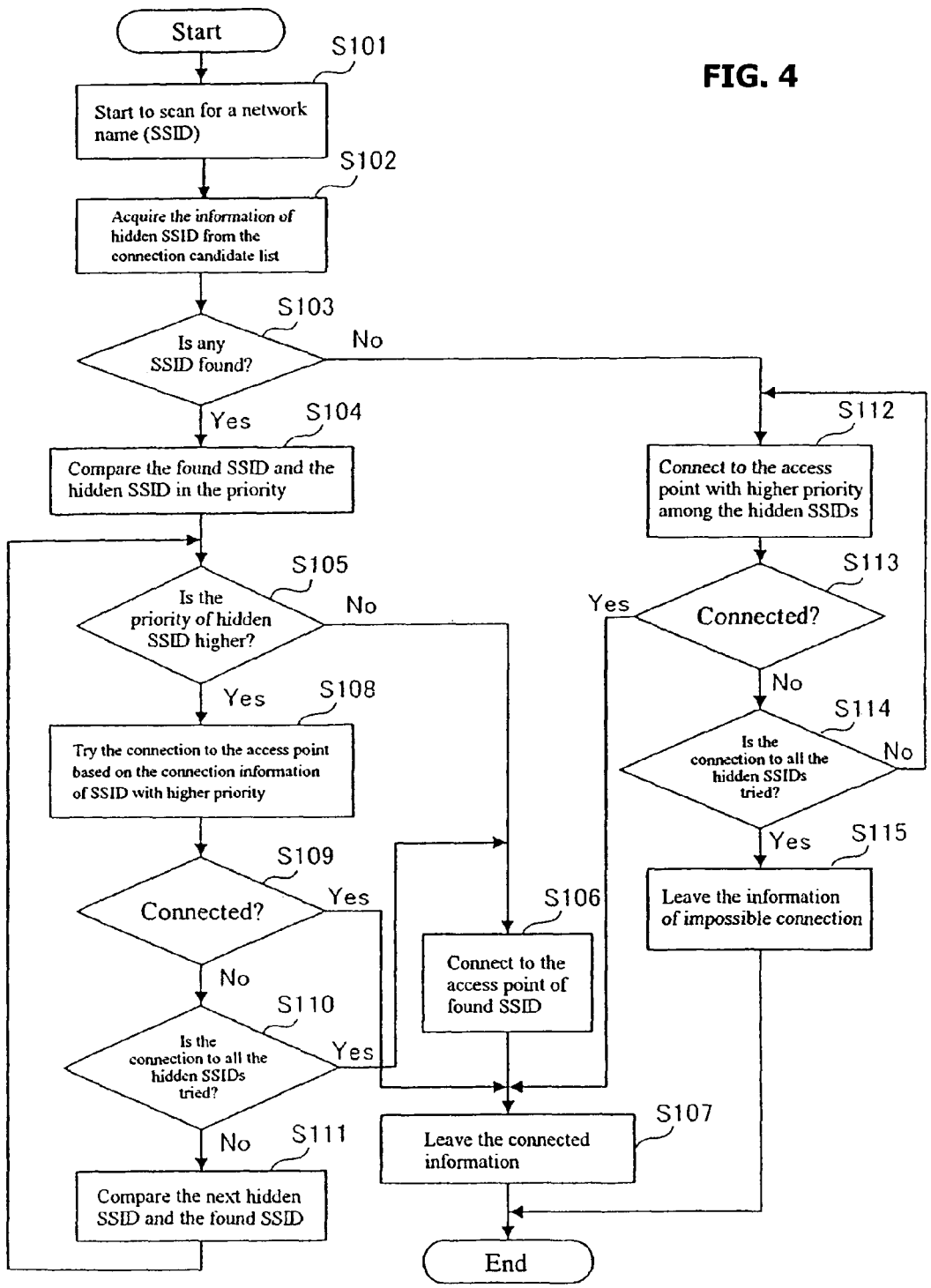
FIG. 4 is a flowchart for explaining a cyclic algorithm according to the embodiment of the invention.

FIG. 4 is a flowchart for explaining a cyclic algorithm according to the embodiment 1 of the invention. For example, as a trigger when the computer apparatus is restarted by opening a cover of the note PC, such as when the computer apparatus is resumed from a suspend state, the wireless function becomes active, so that the flowchart of FIG. 4 is started. Herein, the suspend means a power saving mode of the note PC, in which the minimum amount of power necessary to hold or maintain the data is usable and other power fed to devices not necessary to maintain the integrity of the data is stopped. Also, the resume is a function of starting the operation from an interrupted state, for example, when the power is turned on or the cover of the note PC is opened.

First of all, if the access point switching software 51 starts to scan the connection candidate list for the network name (SSID), as shown in FIG. 3, and acquires the network name (SSID) from the peripheral access point (step 101). Also, the information of the hidden SSID with flag U is acquired from the connection candidate list (step 102). Herein, a determination is made whether or not the network name (SSID) in the connection candidate list is acquired (step 103). If so, the procedure goes to step 104, or if not, transfers to step 112.

First of all, if the network name (SSID) is acquired, the found SSID and the hidden SSID are compared (step 104). Then, a determination is made whether the hidden SSID has a higher order of priority than the found SSID (step 105). If the hidden SSID has a lower order of priority or the found SSID has a higher order of priority, the connection to the access point with the SSID found by this scan is made (step 106), the connected information is left in the hard disk drive 28 (step 107), and the procedure is ended.

If the hidden SSID has a higher order of priority at step 105, the connection to this access point is tried on the basis of the connection information of the SSID with higher order of priority (step 108). Herein, a determination is made whether or not the connection is made (step 109). If connected, the connected information is left in the hard disk drive 28 (step 107), and the procedure is ended. If not connected, a determination is made whether or not there is no hidden SSID on the list as a result of trying the connection to all the hidden SSIDs (step 110). If there is no hidden SSID, the procedure transfers to step 106, where the connection to the access point with the SSID found by scanning is made, the connected information is left or remains stored (step 107), and the procedure is ended. If there is left any hidden SSID at step 110, the hidden SSID with the next higher order of priority and the SSID found by scanning are compared (step 111), and the procedure goes to step 105 to repeat the above processing.

On the other hand, if the SSID is not found at step 103, the connection to the access point with higher order of priority among the hidden SSIDs in the list is tried on the basis of the connection information (step 112). As a result, a determination is made whether or not the connection is made (step 113). If connected, the connected information is left (step 107), and the procedure is ended. If not connected, a determination is made whether or not there is no hidden SSID on the list as a result of trying the connection to all the hidden SSIDs (step 114). If there are any hidden SSID remaining in the list, the procedure goes to step 112 to repeat the above processing. If there are no more remaining hidden SSIDs in the list, the unconnected information is remains intact on the hard disk drive 28 (step 115), and the procedure is ended. The network name with flag U (Unknown) in the connection candidate list as shown in FIG. 3 is treated as the hidden SSID with flag H (Hidden).

In the way, in the cyclic algorithm that is performed in the process of FIG. 4, first of all, it is confirmed that there is a "hidden access point" with higher order of priority than the "access point with the SSID recognized by scanning" for the network name acquired by scanning on the basis of the connection candidate list as shown in FIG. 3. Next, the connection to the "hidden access point" is tried, and if connected, the radio communications are continued via the "hidden access point". All the connection confirmation is made at the "hidden access point" with higher order of priority than the access point with the highest order of priority among the "access points with the SSID recognized by scanning", and if the connection is not made, the radio communications are performed via the access point with the highest order of priority among the "access points with the SSID recognized by scanning".

In this way, the connection to the access point is performed on the basis of the connection candidate list stored in the connection list table 53 as shown in FIG. 3, whereby the contents of the connection candidate list for use in making this connection are updated frequently at each time of the actual connection. For example, the user inputs the setting information of the network at the first time, and presses a connect button to try an actual connection, whereupon it is found that the name of access point has been issued. In this way, at every time of connection, it is known that the network name is publicized, and its information is stored in the connection list table 53. When connected successively, the network name is hidden at first, but may be issued thereafter, in which the flag is changed from H to P.

Figure 5:
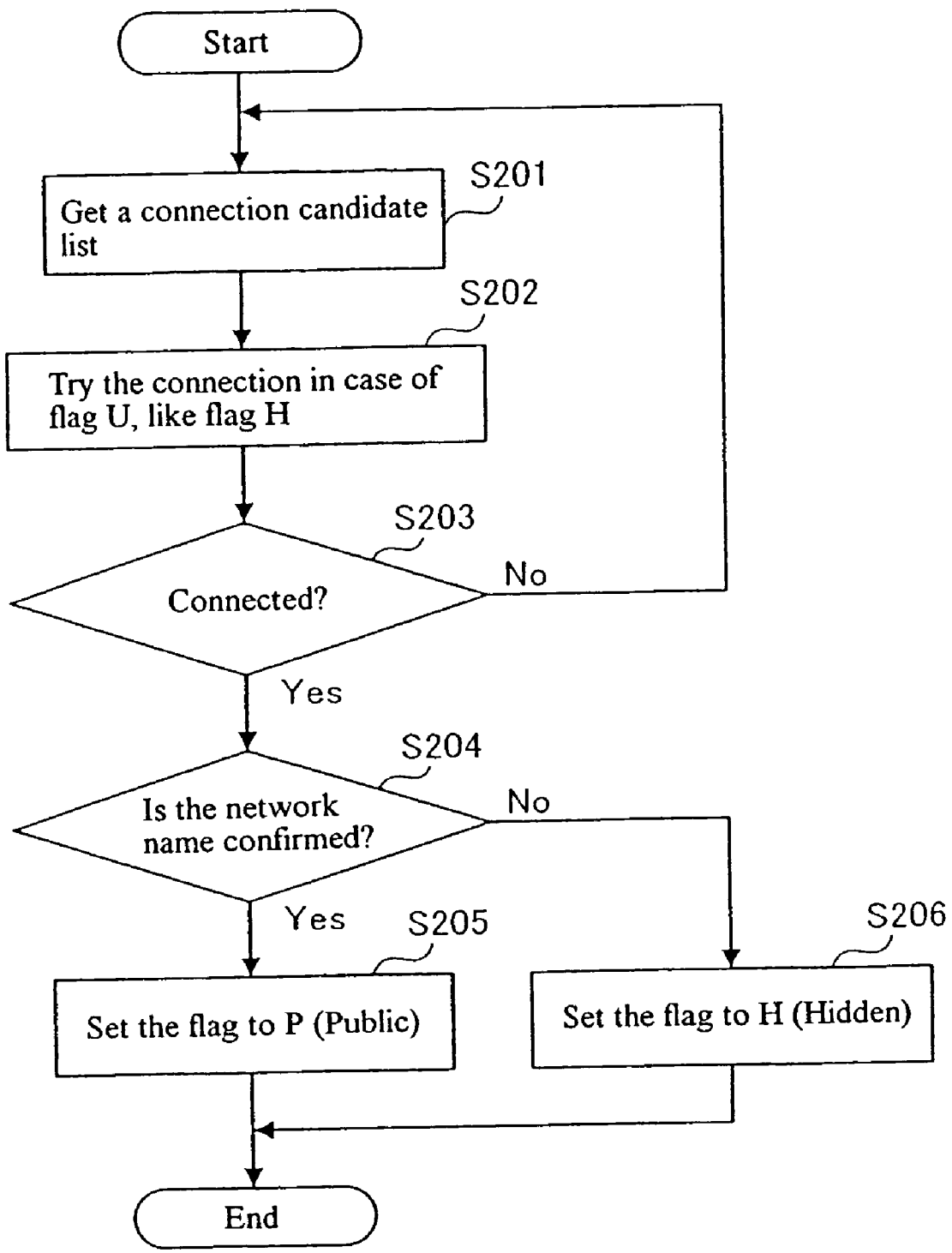
FIG. 5 is a flowchart showing a process for updating the connection list table.

FIG. 5 is a flowchart showing a process for updating the connection list table 53. This series of processing steps are performed by the access point switching software 51. If the process of the cyclic algorithm as shown in FIG. 4 is started, first of all, the connection candidate list stored in the connection list table 53 is acquired (step 201). Next, for the flag U (unknown) entries, the connection is tried like the flag H (Hidden) (step 202). Then, a determination is made whether or not the connection is made (step 203). If not connected, the procedure returns to step 201 to repeat the operation until the entire connection candidate list is processed. If connected, a determination is made whether or not the network name is confirmed (step 204). If the network name is confirmed, the flag is set to P (Public) (step 205). If the network name is not confirmed, the flag is set to H (Hidden) (step 206). This processing is performed every time the connection to the access point is made to update the connection list table 53, and the procedure is ended.

FIG. 6 shows an example of a switching list table displayed to the user. In the switching list table for access point as shown in FIG. 6, the contents stored in the connection list table 53 are displayed on the display screen such as the liquid crystal display (LCD) of the note PC on the basis of execution of the access point switching software 51. In a display example of FIG. 6, the location profile name is displayed along with the order of priority and the information of the network name (SSID). This location profile is provided to simplify the input operation for parameters that must be decided to make connection to the network, using the concept of "location" with which the inexperienced user (beginner) can intuitively recognize the network settings. The parameters that must be decided to make connection to this network correspond to a "network adapter for use in the communications" and the "network settings given to the network adapter", for example. As shown in FIG. 6, one registers the location names of office seat, conference room, movement on the road, airport, hotel, and house so as for the user to recognize them easily. The user simply selects a preset location name at a movement site, using various pointers (not shown). Thereby, the user can perform the network connection by switching the interface and connection settings at a time without any complex operation (interface switching and connection settings switching). This profile information is stored as a location profile database in the hard disk drive 28, whereby the setting information is called and employed by the user who designates the profile.

The access point switching software 51 tries the connection to the access point by referring to the network name (SSID) in the switching list table having the order of priority as shown in FIG. 6. At this time, the access point switching software 51 tries the connection from the location profile with the higher order of priority, whereby the location profiles checked in the list are automatically switched as shown in FIG. 6. Moreover, it is determined whether or not the result of retrieving the access point exists in the table. If the retrieval result does not exist in the list, the "hidden network name (SSID)" is only selected from the list, and the connection to the access point is actually tried at that place.

Herein, as a result of trying the connection, if there is no access point in the connection candidate list, a part (RF section 32 of the radio LAN card 30) regarding the radio transmitting and receiving function is stopped (turned off), namely, the radio signal of the radio LAN is automatically turned off to reduce the power consumption in this embodiment. For example, if a part of the RF section 32 is turned off, it is possible to reduce the power consumption of the radio LAN card 30 to about 40 mW or less, and thereby to cut down the consumption of battery in the note PC.

Figure 7:
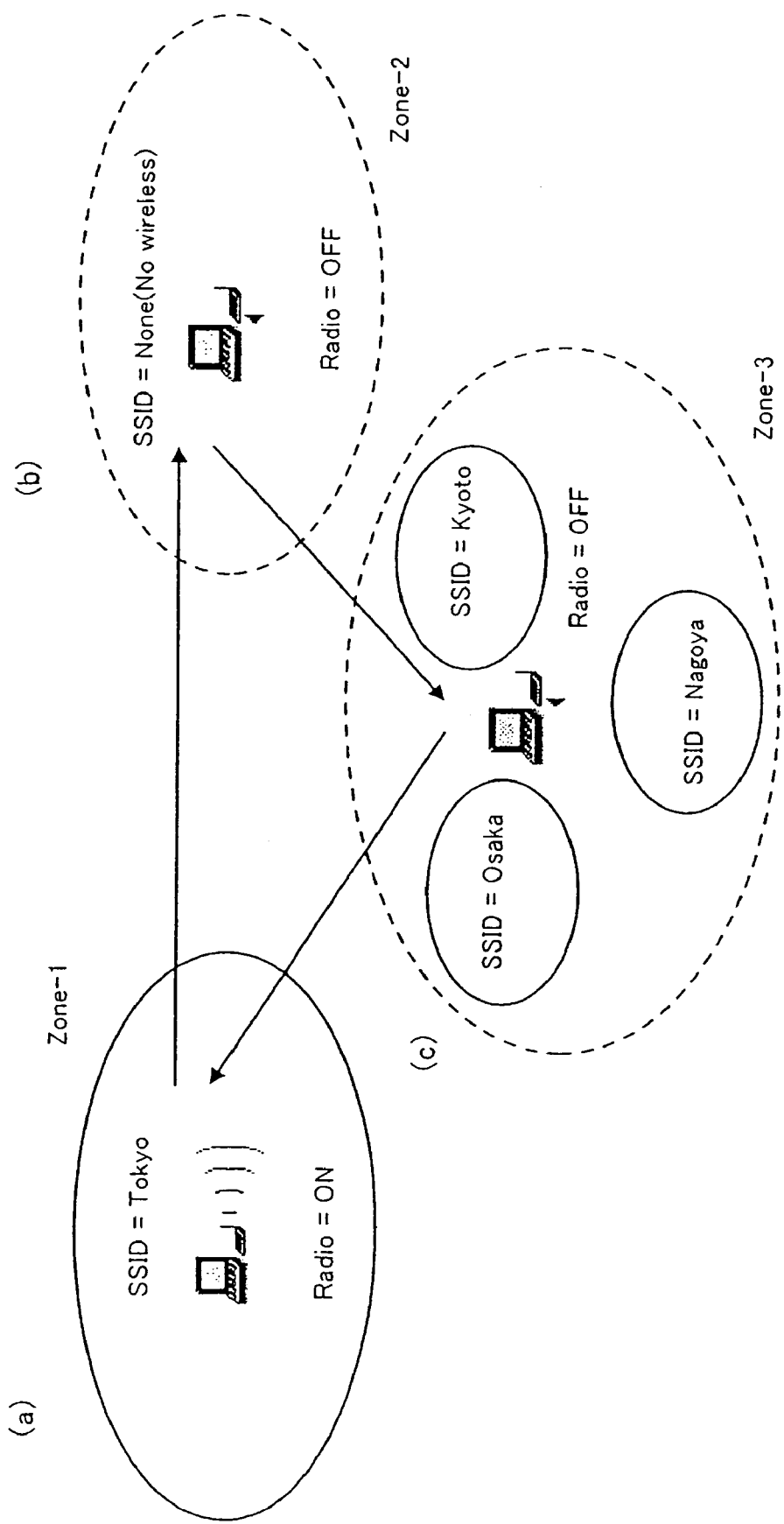
FIGS. 7A to 7C are views for explaining a power management method according to the embodiment of the invention.

FIGS. 7(*a*) to 7(*c*) are views for explaining a power management method according to the embodiment of the invention. In FIG. 7(*a*), the note PC of interest makes the radio communications (Radio=ON) via the access point with network name (SSID)=Tokyo under the environment of zone 1 (Zone-1). Now, supposed that the user carrying the note PC closes the cover of the note PC to end the radio communications to place the note PC in a suspend state, and moves to the environment of zone 2 (Zone-2) as shown in FIG. 7(*b*). At this time, there is no access point nearby for the radio communications under the environment of zone 2 (Zone-2). At this time, suppose that the user carrying the note PC opens the cover, so that the note PC is changed from the suspend state to a resume state. Since the radio communications are not performed under the environment of zone 2 (Zone-2), the access point switching software 51 of the note PC executes the cyclic algorithm including retrieving the network name (SSID) by scanning and confirming the connection to the hidden SSID, whereby it is recognized that there is no connectable access point. On the basis of this recognition, the access point switching software 51 dictates to a MAC controller 31 of the radio LAN card 30 to stop (turn off) the RF section 32. This stopping (power off) of the RF section 32 is performed upon an explicit designation from the user, as well as when the note. PC is newly started or the note PC transfers to the resume state, and is continued until the cyclic algorithm is executed.

Consider an instance where the user existing under the environment of zone 2 (Zone-2) of FIG. 7(b) has moved to the environment of zone 3 (Zone-3) of FIG. 7(c), carrying the note PC. Under the environment of zone 3 (Zone-3), it is possible to make the radio communications via the access points corresponding to SSID=Osaka, SSID=Kyoto and SSID=Nagoya. Then, the access point switching software 51 of the note PC executes the cyclic algorithm including retrieving the network name (SSID) by scanning and confirming the connection to the hidden SSID, when the cover of the note PC is opened, or the note PC is restarted. However, in the note PC as shown in FIG. 7, the SSIDs having the network names of SSID=Osaka, SSID=Kyoto and SSID=Nagoya are not registered in the connection list table of the note PC. Therefore, the access point switching software 51 dictates the RF section 32 to be stopped (turned off) in a state where the power of the overall system is kept on, so that the note PC transfers to a power saving mode (low power consumption mode) for the radio communications. Consequently, the power consumption of battery in the note PC is reduced.

Next, consider an instance where the user carrying the note PC has moved under the environment of zone 1 (Zone-1) as shown in FIG. 7(a). For example, the power of the stopped RF section 32 is turned on by placing the note PC from the suspend to resume or restart state, whereby the cyclic algorithm including retrieving the network name (SSID) and confirming the connection to the hidden SSID is executed. Consequently, it is possible to make the radio communications through the network with SSID=Tokyo.

Figure 8:
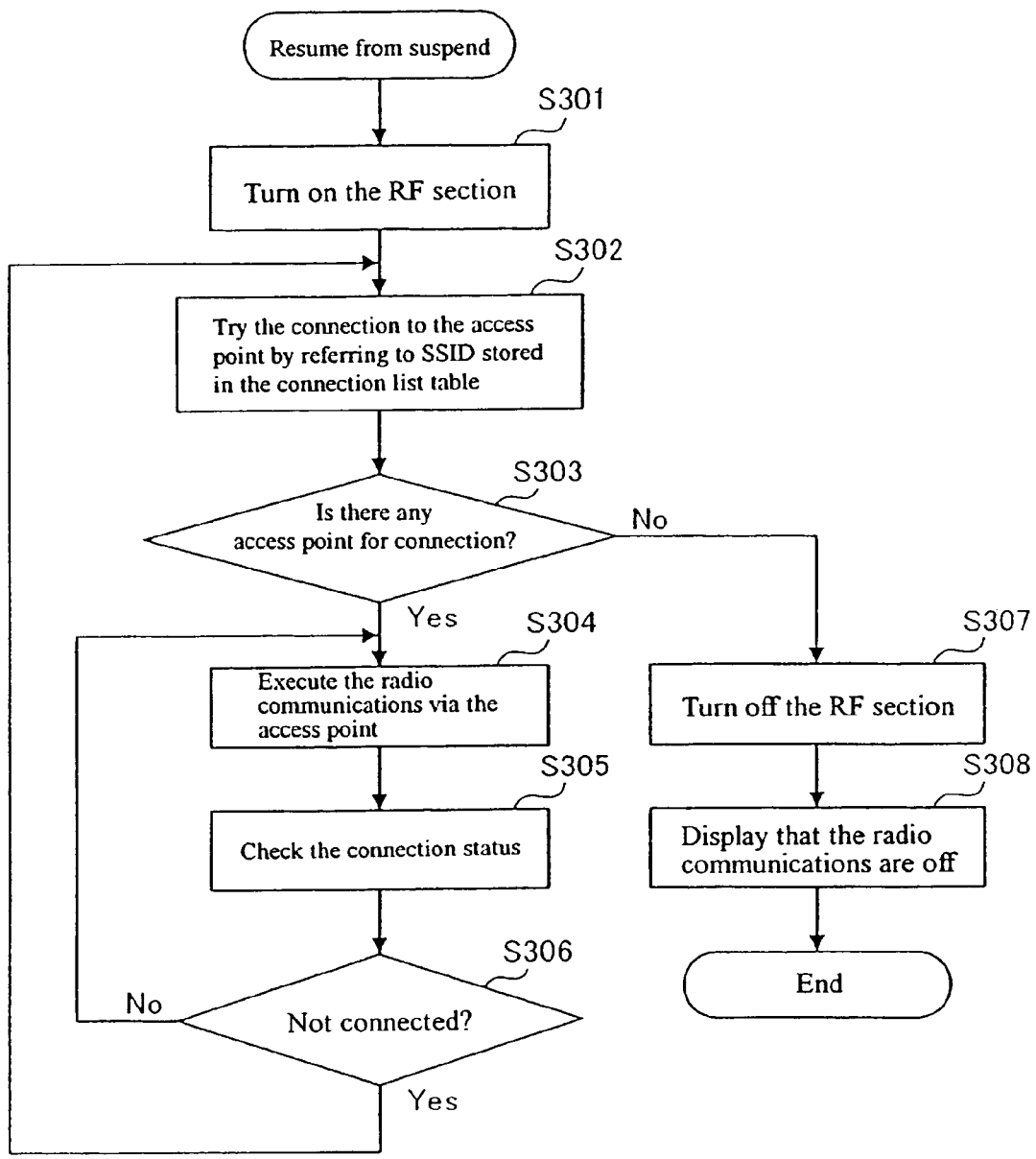
FIG. 8 is a flowchart showing a process for stopping the radio transmitting and receiving function.

FIG. 8 is a flowchart showing a process for stopping the radio transmitting and receiving function. For example, if the note PC is resumed from the suspend state, the process is started, whereby the RF section 32 for performing the radio transmitting and receiving function of the radio LAN is turned on (step 301). Next, the access point switching software 51 tries the connection to the access point by referring to the SSID stored in the connection list table 53 (step 302). As a result of this connection, a determination is made whether or not there is an access point to be connected (step 303).

At step 303, if there is an access point, the radio communications are performed via this access point (step 304). In this case, the connection status is checked (step 305). If a connection is impossible, the procedure returns to step 302, where the connection to another connection point is tried. If the connection is possible, the execution of radio communications at step 304 is continued (step 306). If no access point to be connected exists at step 303, the RF section 32 is turned off to stop the radio transmitting and receiving function (step 307). Next, the off state of the radio communications is indicated to the user on the display, employing an icon display (step 308), and the procedure is ended. In this way, in a power saving function of this embodiment, a radio off command is sent to the firmware built in the radio LAN card 30 through the CPU 21, shutting off the RF section 32 of the radio LAN card 30, whereby it is possible to reduce the power consumption of the computer system in the note PC.

Figure 9:
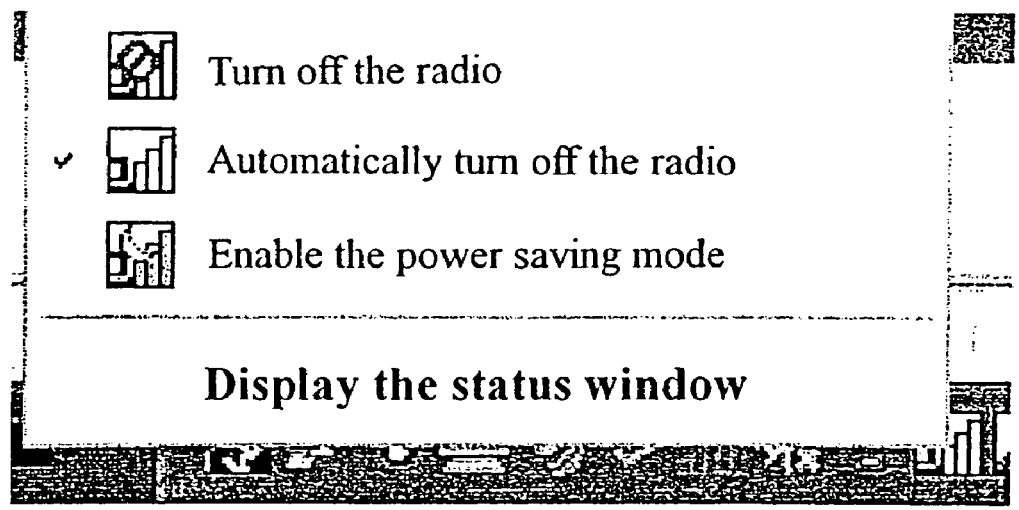
FIG. 9 is a diagram for explaining a user interface for power management by turning on or off the radio LAN.

FIG. 9 is a diagram for explaining a user interface for power management by turning on or off the radio LAN. Herein, a plurality of items are displayed on the display screen of the note PC for the user to designate or select them. In this example of FIG. 9, three items of "turn off the radio", "automatically turn off the radio" and "enable the power saving mode" are displayed, allowing the user to designate them, employing a predetermined pointing device. For example, in order to automatically turn off the radio signal of the radio LAN when there is no access point of candidate in the connection candidate list stored in the connection list table 53, as previously described, the user only needs to designate the item "automatically turn off the radio" on the display screen as shown in FIG. 9.

As detailed above, according to this embodiment, the connection to the access point is made by combining the scan with the actual connection. Employing such a method or a so-called hybrid method, the connection time is greatly shortened and the radio LAN connection can be made via the so-called "hidden access point" in which the network name is not publicized. This method solves the problem that the connection time is lengthened when the user has a plurality of connection lists in the system. Moreover, the network as the connection destination has the preset order of priority corresponding to the network name, whereby the more preferred network is chosen under the environment where a plurality of radio networks are applicable.

Moreover, in this embodiment, the information designating whether the access point is public or hidden, or whether the identification information such as the network name (SSID) is publicized or not, is stored in the connection list table, associated with the network name. This connection list table is updated dynamically, whereby the latest status of the access point is grasped on the basis of the connection status. Also, a function of controlling the power state (on/off) of the radio function is added, besides turning on/off the system main unit, whereby the power consumption is cut down or reduced. Especially in mobile terminal equipment such as the note PC powered by using a battery, where the operational life of battery is lengthened.

Embodiment 2

In embodiment 2, the note PC in one form of the computer apparatus (mobile terminal equipment) is provided with an attitude fluctuation sensor for sensing that the apparatus (wireless client) is moved, in which whether or not to start the scan is decided, depending on a movement of the wireless client. The same functions of the embodiment 1 are designated by the same numerals, and not described in detail here.

Figure 10:
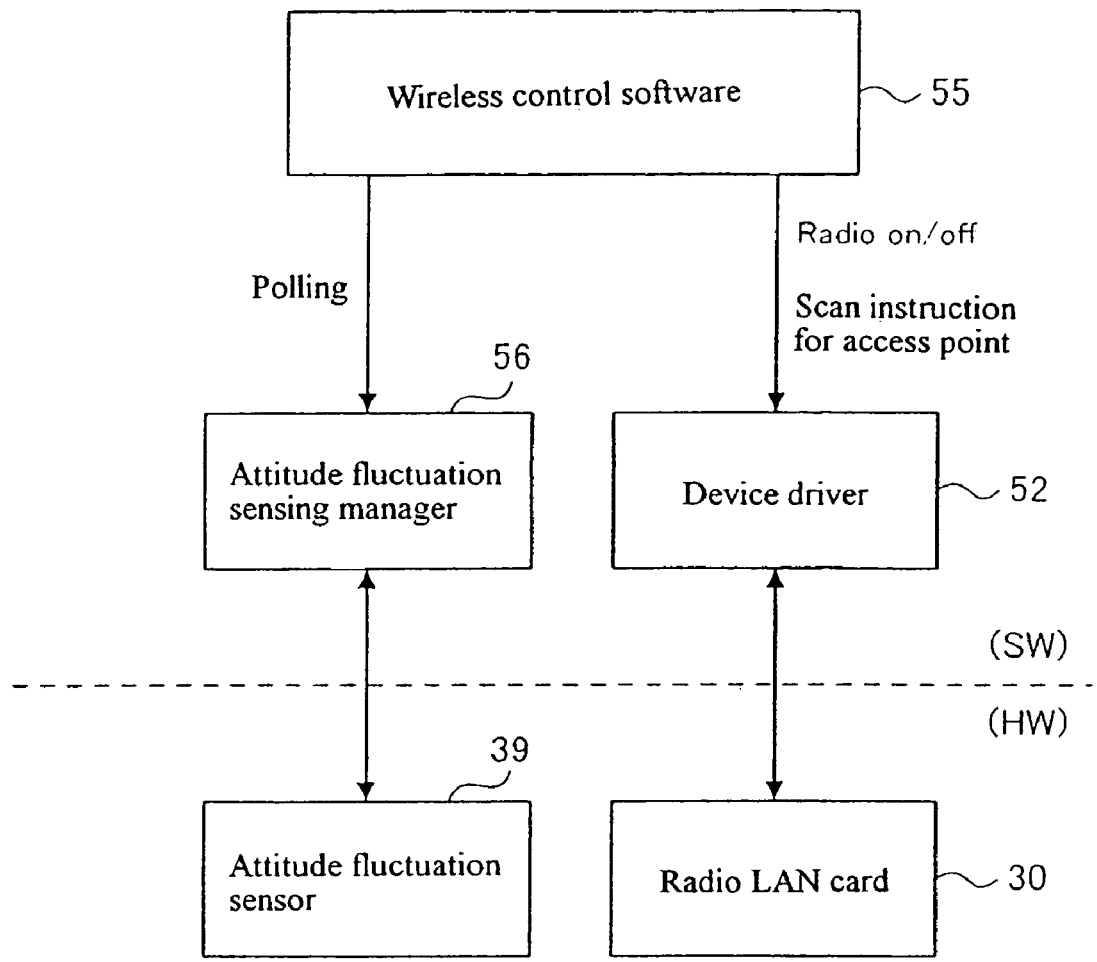
FIG. 10 is a block diagram for implementing a scan start function with attitude movement detection according to an embodiment 2 of the invention.

FIG. 10 is a block diagram for implementing a scan start function with attitude movement detection according to embodiment 2 of the invention. Herein, the hardware configuration is composed of the radio LAN card 30 that is a wireless LAN hardware and an attitude fluctuation sensor 39 for sensing whether or not the wireless client is moved. The attitude fluctuation sensor 39 is an acceleration sensor, for example, which can sense the inclination, or may be a sensor for sensing a shock that is provided inside the note PC (e.g., a sensor required for protecting the hard disk unit from a rude or abrupt shock).

The software configuration is composed of a wireless control software 55 that is an application software for controlling the wireless client, the wireless control software 55 being executed by the CPU 21, a device driver 52 that is a software for managing the radio LAN card 30, and an attitude fluctuation sensing manager 56 that is a software for sensing that the note PC is moved, on the basis of the result detected by the attitude fluctuation sensor 39.

As described in embodiment 1, when the system is resumed from the suspend, or when there is no access point registered in the location profile of FIG. 6 by scanning the access point at the time of system boot, it is possible to save power by stopping (turning off) a part regarding the radio transmitting and receiving function, namely, disabling a radio communications circuit (Radio Circuit). However, when no access point is found at a certain location, and the location is changed while the system is operating after the Radio Circuit is disabled, the Radio Circuit remains disabled at the new destination. At this time, even if there is any access points at the new destination, roaming cannot be made. Thus, in this embodiment, it is detected whether or not the wireless client is moved, employing the attitude fluctuation sensor 39, whereby the computer apparatus transfers from a Radio off state to the normal operation mode on the basis of this detection.

Figure 11:
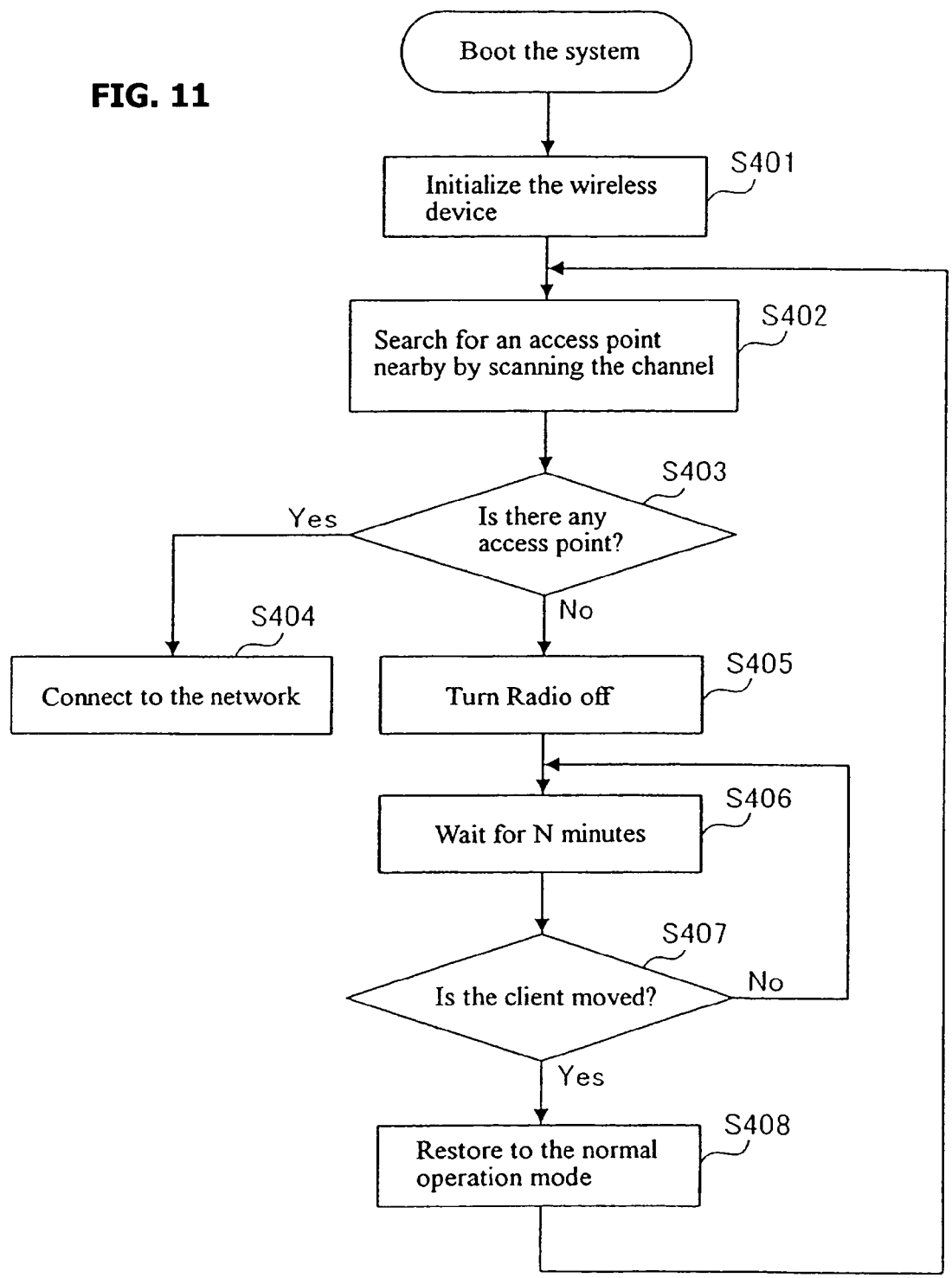
FIG. 11 is a flowchart showing a scan start process with attitude fluctuation detection.

FIG. 11 is a flowchart showing a scan start process with attitude fluctuation detection. After the system is booted, the device driver 52 that controls the wireless device is initialized upon an instruction from the wireless control software 55 (step 401). The device driver 52 searches for an access point by scanning the channel (step 402). At step 403, if it is determined that there is any access point, the computer apparatus is connected to the network via the access point (step 404). If it is determined that there is no access point, the computer apparatus is placed in the Radio off state in accordance with an instruction from the wireless control software 55 (step 405). This Radio off state is where the power saving mode significantly cuts or reduces power, and no power is consumed or wasted by the wireless function.

The wireless control software 55 periodically polls the attitude fluctuation sensing manager 56 for a "movement" of the wireless client. That is, the procedure waits for N minutes (step 406), and a determination is made whether or not the wireless client is moved (step 407), as shown in FIG. 11. If the wireless client is not moved, the process from step 406 is repeated. If the wireless client is moved, Radio is enabled to restore the operation to the normal operation mode (step 408), and then the procedure goes to step 402 to instruct the device driver 52 to restart the scan.

Figure 12:
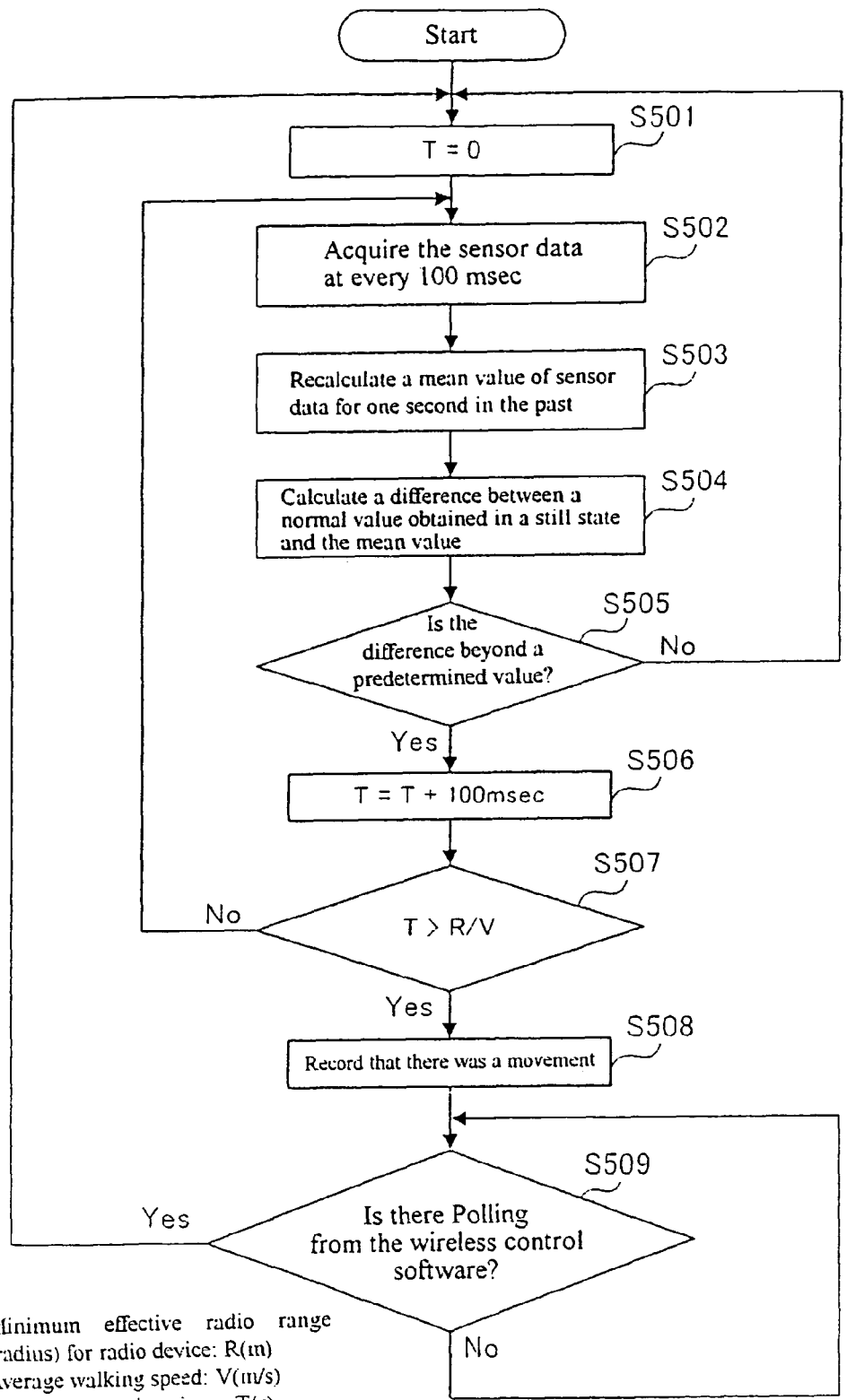
FIG. 12 is a flowchart showing a process for detecting a movement state that is performed in parallel by an attitude fluctuation sensing manager.
Figure 13:
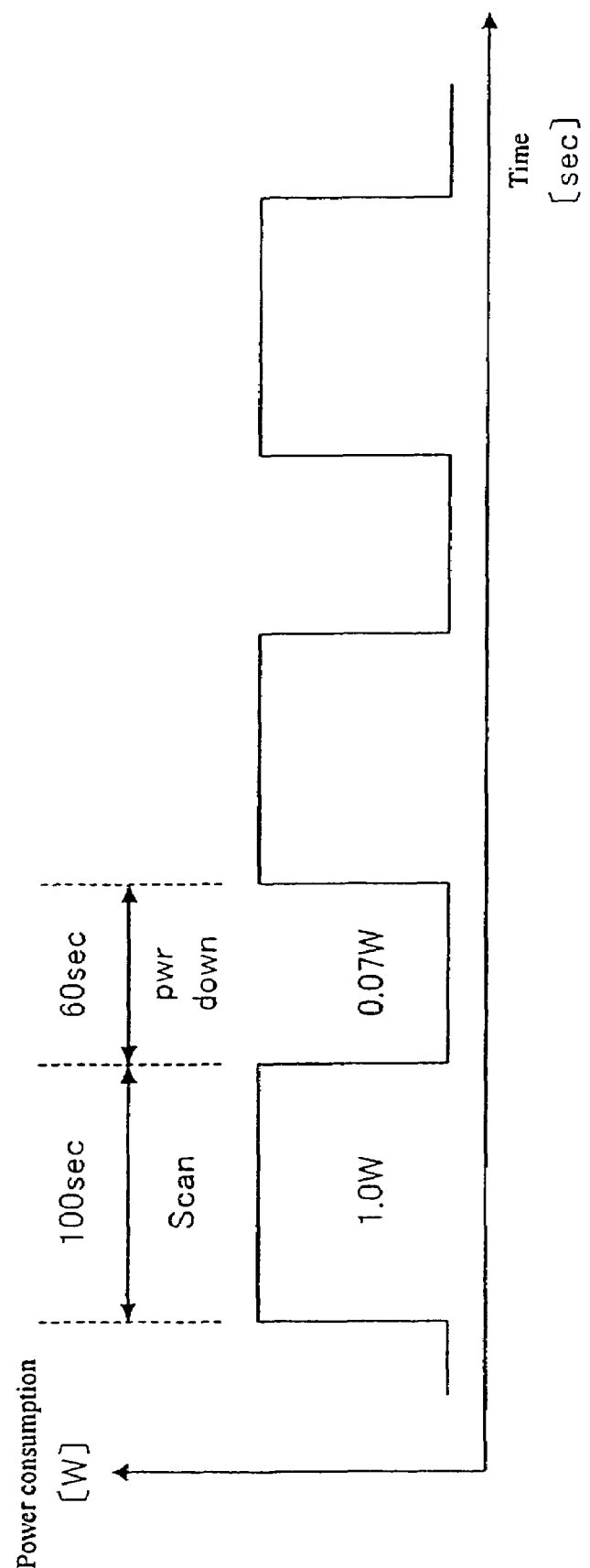
FIG. 13 is a chart showing a variation in power consumption in a dual mode wireless LAN adapter.

FIG. 12 is a flowchart showing a process for detecting the movement state that is performed in parallel by the attitude fluctuation sensing manager 56. First of all, a movement monitor timer T(s) is set to 0 as the initial value (step 501), and the sensor data from the attitude fluctuation sensor 39 is acquired at every 100 msec, for example (step 502). Next, the mean value of sensor data for one second in the past is recalculated (step 503), and a difference between the normal value obtained in the still state and the mean value is calculated (step 504).

Thereafter, a determination is made whether or not the calculated difference is beyond a predetermined value (step 505). If not, the procedure returns to step 501. If beyond the predetermined value, 100 msec is added to the movement monitor timer T (step 506). Next, a determination is made whether this movement monitor timer T is greater than the minimum effective radio range (radius) R(m) divided by the average walking speed V(m/s), namely, $$T > R/V$$

(step 507). If not greater, the procedure returns to step 502. If greater than, the presence of movement is recorded in the memory 22 as shown in FIG. 1 (step 508). Thereafter, a determination is made whether or not there is any polling from the wireless control software 55 (step 509). If there is no polling, the operation waits for polling. If there is polling, the process from step 501 is repeated.

In this way, according to the embodiment 2, the attitude fluctuation sensor 39 senses that the note PC of the wireless client is moved (there is any attitude fluctuation), and the attitude fluctuation sensing manager 56 that is a software for controlling the attitude fluctuation sensor 39 stores or memorizes the sensed result. On the other hand, the wireless control software 55 for controlling the wireless client periodically polls the attitude fluctuation sensing manager 56 for a "movement". If movement is sensed and the radio communications circuit (Radio Circuit) is disabled, the wireless control software 55 instructs the device driver 52 of the wireless LAN to enable the radio communications circuit, and restart the scan.

With this configuration, even when the radio function is turned off in a mode "automatically turn off the radio" to cut down the power consumption for the radio LAN, it is possible to restart the scan for the access point of the radio LAN by detecting a predetermined movement state of the wireless client. That is, when the access point is not found at a certain location, and the location is changed while the system is kept operating after the Radio Circuit is disabled, the Radio Circuit is automatically enabled at the movement destination. Consequently, the roaming for the access point at the movement destination is appropriately made, whereby the power consumption of the system is reduced, and the system availability or a so-called usability is greatly improved.

Embodiment 3

In this embodiment 3, employing the attitude fluctuation sensor 39 and the attitude fluctuation sensing manager 56 in the embodiment 2, the scanning for the access point at every fixed time is controlled in accordance with whether or not the apparatus (wireless client) is moved. The same functions as in the embodiments 1 and 2 are designated by the same numerals, and not described in detail here.

One of the important functions of utility for controlling the wireless is a location profile roaming. This is a function of switching the profile of network when the client PC with the wireless LAN mounted is moved from one location to another. To implement this function, it is required to periodically sense (scan) the communicable access point. In a specific software, a command for this scan is sent to the wireless driver once per minute. As a result of the scan, if the access point listed in the profile with higher order of priority than at present is found, the roaming for that access point is made.

However, the scan once per minute has an adverse influence on the communication between the proper client and the access point.

Figure 14:
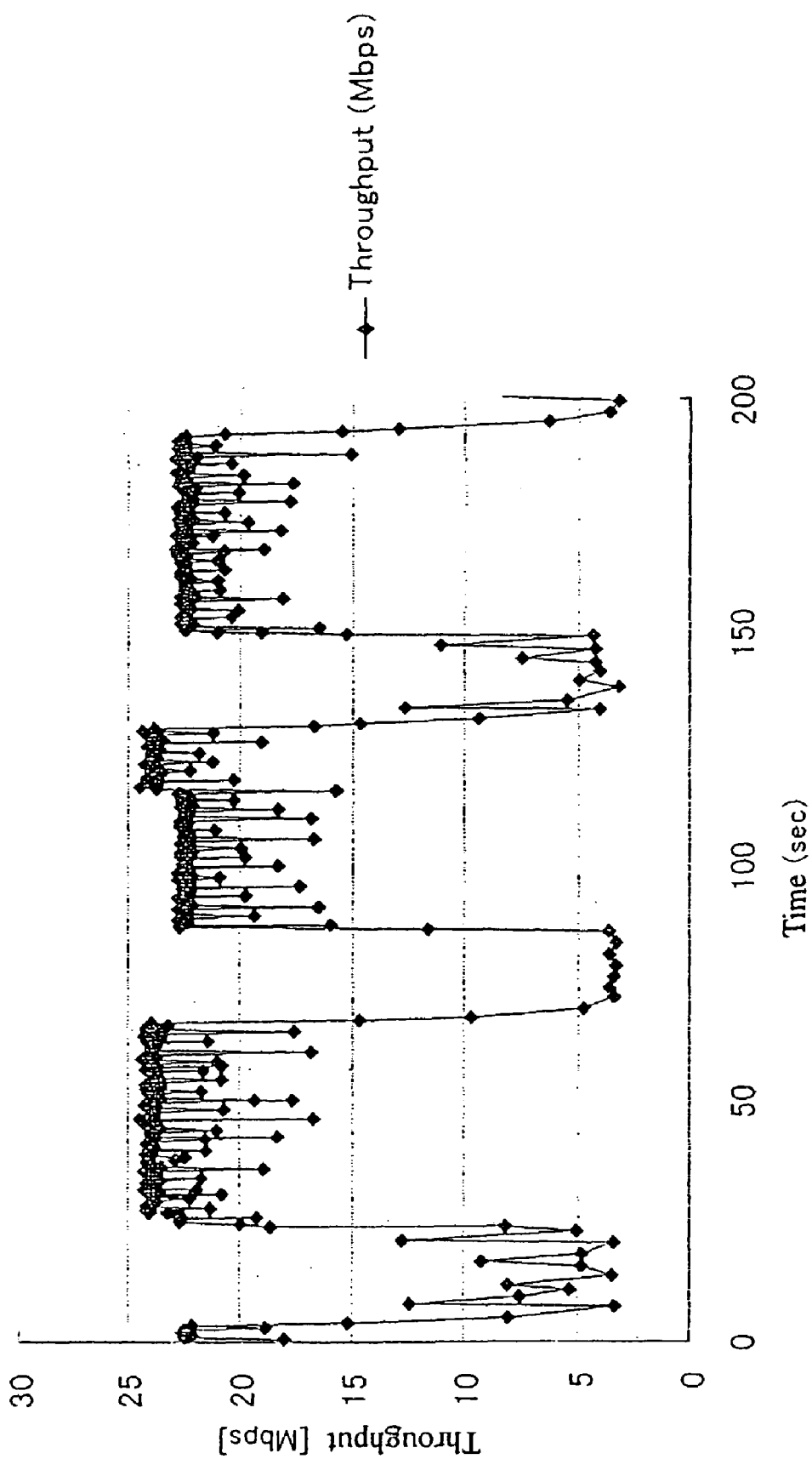
FIG. 14 is a chart showing how the throughput between access point and client transits with respect to the time.

FIG. 14 is a chart showing how the throughput between access point and client transits with respect to the time. The axis of abscissa is the time (seconds) and the axis of ordinates is the throughput (Mbps). The client must stop the communication with the access point during the scan. Consequently, the overall throughput is greatly decreased once per minute for the scan, as shown in FIG. 14. In this embodiment, this problem is solved, employing the attitude fluctuation sensor 39 shown in FIG. 10.

More specifically, the wireless control software 55 as shown in FIG. 10 makes an inquiry to the attitude fluctuation sensing manager 56 about whether there is a movement of the client (attitude fluctuation) before making the scan for the scheduled profile. Whether or not the client is moved is sensed employing the attitude fluctuation sensor 39. If there is no movement detected, the scan is canceled and the timer is restarted to count (e.g., one minute) for the next scan. If there is any movement detected, the profile is scanned. As a result of scan, if an access point listed in the profile with a higher order of priority than the present access point is found, the roaming for the access point is made. If the access point is not found, the timer is restarted to count (e.g., one minute) for the next scan. With this configuration, the resulting lower throughput due to unnecessary scans is avoided or suppressed.

Figure 15:
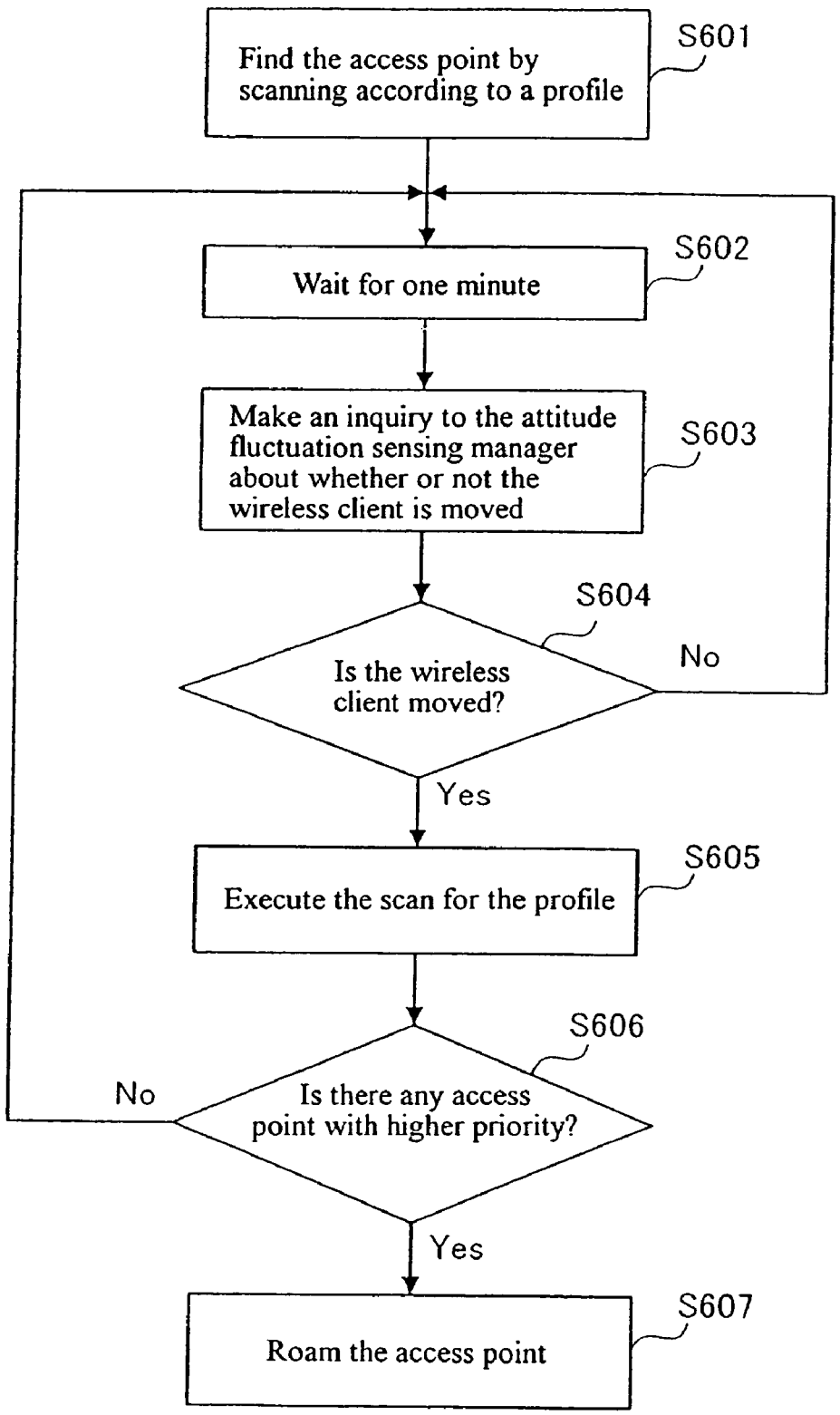
FIG. 15 is a flowchart showing a roaming process for a location profile with attitude fluctuation detection.

FIG. 15 is a flowchart showing a roaming process for a location profile with attitude fluctuation detection. The wireless control software 55 issues an instruction for the device driver 52 to execute the scan on the basis of a setting profile of network stored in the hard disk drive 28 as shown in FIG. 1, whereby the device driver 52 operates the radio LAN card 30 to execute the scan, and find the access point (step 601).

The wireless control software 55 starts the timer to count for the next scan and waits for one minute (step 602), and makes an inquiry to the attitude fluctuation sensing manager 56 about whether there is a movement of the wireless client (step 603). And a determination is made whether or not the wireless client is moved on the basis of the attitude fluctuation sensor 39 (step 604). If there is no movement, the procedure returns to step 602, where the timer is restarted to count to the next scan. If there is any movement, the scan of the setting profile is performed (step 605). By executing the scan, a determination is made whether or not there is any access point with higher order of priority (step 606). If there is no access point with higher order of priority, the procedure returns to step 602, where the timer is restarted to count. If there is any access point with higher order of priority, the roaming for that access point is made (step 607).

In this way, according to this embodiment 3, employing the attitude fluctuation sensor 39 and the attitude fluctuation sensing manager 56, the scan for the access point that is performed at every fixed time is controlled in accordance with whether the apparatus (wireless client) is moved. Generally, since it is difficult to consider that the access point is moved from one place to another, it is hardly thought that a new access point is sensed when the apparatus (wireless client) is not moved. In this case, when the scan is performed in accordance with the settings, there is a lower throughput as shown in FIG. 14. However, according to this embodiment 3, if it is determined that the apparatus (wireless client) is moved, the scan is started, whereby it is possible to reduce the unnecessary scan and suppress the lower throughput when the apparatus has not moved.

In the drawings and specifications there has been set forth preferred embodiments of the invention and, although specific terms are used, the description thus given uses terminology in a generic and descriptive sense only and not for purposes of limitation.

While the present invention has been described with respect to the embodiment of the invention, the technical scope of the present invention is not limited to the described embodiments. Various changes and modifications may be made in the described embodiments. As is apparent from the description in the appended claims, modes of the present invention characterized by such changes and modifications are also included in the technical scope of the invention.

We claim as our invention:

1. An apparatus comprising:
   a radio which makes a wireless communications via a predetermined access point;
   a non-volatile storage device which stores an identification information of a network connection and an information which indicates that an access point for connection to the network is a hidden access point where the hidden access point has not issued the identification information; and
   a connection confirmation unit which confirms the connection by attempting an actual connection to the hidden access point after accessing the information from said non-volatile storage device.

2. The apparatus according to claim 1, further comprising:
   identification information acquiring unit which acquires the predetermined identification information by scanning the identification information for designating a connection partner; and
   connection executing unit which executes the connection to one of a plurality of access points of the network having the predetermined identification information acquired by said identification information acquiring unit and the access point to which the connection is confirmed by said connection confirmation unit.

3. The apparatus according to claim 2, further comprising:
   radio control unit which stops a transmitting and receiving radio when the identification information stored in said non-volatile storage device is not acquired by said identification information acquiring unit and the connection confirmation for the identification information stored in said non-volatile storage device is not made by said connection confirmation unit.

4. The apparatus according to claim 1, wherein said non-volatile storage device stores the identification information of the network appended with an order of priority for the connection.

5. The apparatus according to claim 1, wherein said non-volatile storage device stores the information indicating the access point having issued a network name in association with the identification information of the network.

6. A method comprising the steps of:
   communicating with a predetermined wireless network through an access point;
   acquiring from a non-volatile storage device which stores an identification information of a network connection and an information which indicates that an access point for connection to the network is a hidden access point where the hidden access point has not issued the identification information information indicating that an access point for connecting to the wireless network is a hidden access point; and
   establishing a connection to the wireless network by attempting an actual connection to the hidden access point.

7. The method according to claim 6, further comprising the steps of:
   retrieving a predetermined access point by scanning the identification information stored in the non-volatile storage device; and
   executing the communications via one of a group consisting of a retrieved access point and the hidden access point to which the connection is confirmed on the basis of the information stored in the non-volatile storage device.

8. The method according to claim 6, further comprising the step of:
   stopping a wireless transmitting and receiving radio when the connection to the wireless network having the information stored in the non-volatile storage device is not possible.

* * * * *